(12) United States Patent
Demerath et al.

(10) Patent No.: US 9,464,649 B2
(45) Date of Patent: Oct. 11, 2016

(54) UNIT FOR FASTENING A COMPONENT OF A VEHICLE

(75) Inventors: Michael Demerath, Hueffler (DE); Vitali Leidner, Enkenbach-Alsenborn (DE)

(73) Assignee: ITW Fastener Products GmbH, Liegnitzer (DE)

( * ) Notice: Subject to any disclaimer, the term of this patent is extended or adjusted under 35 U.S.C. 154(b) by 282 days.

(21) Appl. No.: 13/574,666

(22) PCT Filed: Jan. 26, 2011

(86) PCT No.: PCT/EP2011/000342
§ 371 (c)(1),
(2), (4) Date: Sep. 12, 2012

(87) PCT Pub. No.: WO2011/095297
PCT Pub. Date: Aug. 11, 2011

(65) Prior Publication Data
US 2013/0199015 A1   Aug. 8, 2013

(30) Foreign Application Priority Data
Feb. 2, 2010   (DE) .................. 10 2010 006 571

(51) Int. Cl.
*A44B 1/04*  (2006.01)
*B60R 13/02*  (2006.01)
(Continued)

(52) U.S. Cl.
CPC ........... *F16B 5/065* (2013.01); *B60R 13/0206* (2013.01); *F16B 21/065* (2013.01);
(Continued)

(58) Field of Classification Search
CPC .. B60R 13/0206; F16B 5/065; F16B 21/065; Y10T 24/309

USPC .......................................... 24/289, 292, 297
See application file for complete search history.

(56) References Cited

U.S. PATENT DOCUMENTS 1,091,449 A * 3/1914 Westin .......................... 280/449
5,100,272 A * 3/1992 Jadoul et al. ................... 411/45
(Continued)

FOREIGN PATENT DOCUMENTS

| DE | 4211072 | 1/1993 |
|----|---------|--------|
| DE | 19854335 | 6/2000 |

(Continued)

OTHER PUBLICATIONS

Translation of DE102009007065.*

*Primary Examiner* — Robert J Sandy
*Assistant Examiner* — Matthew Sullivan
(74) *Attorney, Agent, or Firm* — Joseph M. Butscher; The Small Patent Law Group, LLC

(57) ABSTRACT

The invention relates to an assembly (10) for attachment of a component of a motor vehicle, in particular for attachment of a lining part (35) to a carrier (20), having a first holding part (12) and a second holding part (14), the first holding part (12) having at least one abutment (26) and the second holding part (14) having at least one detent hook (36), and having a locking bar (15) which can be moved between a release position, in which the detent hook (36) can move behind, and be released from, the abutment (26), and a locking position, in which the detent hook (36) is locked behind the abutment (26), the locking bar (15) automatically moving from the release position to the locking position. The invention further relates to a method of mounting and of dismounting said assembly.

20 Claims, 4 Drawing Sheets

(51) Int. Cl.
  *F16B 21/06* (2006.01)
  *F16B 21/08* (2006.01)
  *F16B 5/06* (2006.01)

(52) U.S. Cl.
  CPC ............ *F16B 21/08* (2013.01); *F16B 21/086* (2013.01); *Y10T 24/45178* (2015.01); *Y10T 29/49815* (2015.01); *Y10T 29/49826* (2015.01)

(56) References Cited

U.S. PATENT DOCUMENTS

| 2002/0031400 | A1 | 3/2002 | Schwarz | |
|---|---|---|---|---|
| 2007/0212166 | A1* | 9/2007 | Rudduck | 403/324 |
| 2008/0014045 | A1* | 1/2008 | Kawai | 411/45 |
| 2009/0190087 | A1* | 7/2009 | Hsu | 351/57 |
| 2010/0146744 | A1* | 6/2010 | Welter et al. | 24/292 |
| 2010/0162534 | A1* | 7/2010 | Kato | 24/292 |
| 2012/0240363 | A1* | 9/2012 | Lee | 24/297 |

FOREIGN PATENT DOCUMENTS

| DE | 20015848 | 2/2001 |
|---|---|---|
| DE | 10057947 | 6/2001 |
| DE | 10 2009 007 065 | 9/2009 |
| JP | 61118086 | 7/1986 |
| JP | 3-4943 | 2/1991 |
| JP | 2000304020 | 10/2000 |

\* cited by examiner

Fig.6
a)
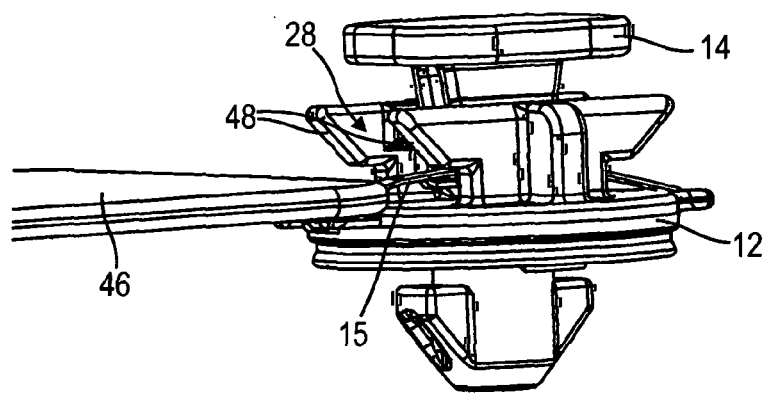
b)
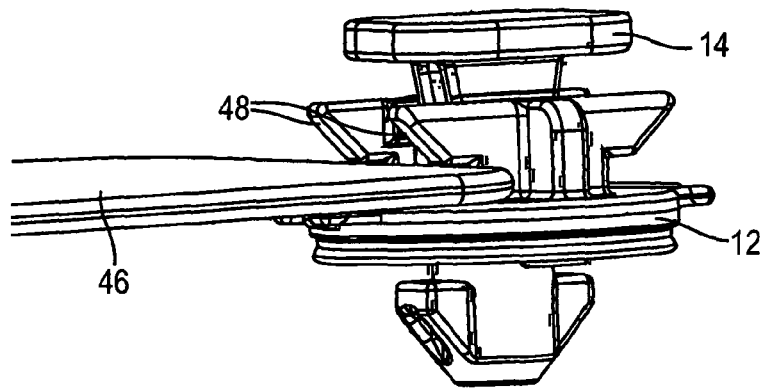

UNIT FOR FASTENING A COMPONENT OF A VEHICLE

RELATED APPLICATIONS

This application corresponds to PCT/EP2011/000342, filed Jan. 26, 2011, which claims the benefit of German Application No. 10 2010 006 571.4, filed Feb. 2, 2010, the subject matter, of which are incorporated herein by reference in their entirety.

BACKGROUND OF THE INVENTION

The present invention relates to an assembly for attachment of a component of a vehicle, in particular for attachment of a lining part to a carrier, including first and second holding parts.

Fastening clips consisting of two holding parts are used for attachment of panel parts in a vehicle, for example for the attachment of lining parts to a carrier or vehicle body part. A first holding part is attached to the carrier and the second one to the lining part. The holding parts are subsequently connected with each other, for example by means of a detent connection, so that the lining part is reliably secured to the carrier. High demands are made on these holding parts and the detent connection produced between them: On the one hand, a connection which is as firm as possible is intended to be produced between the lining part and the carrier, so that a release, e.g. in the event of a crash, is excluded. On the other hand, it is desirable that the holding parts can be separated from each other in a simple way in order to allow the lining part to be dismounted simply and quickly, for example for a replacement of the lining part.

SUMMARY OF THE INVENTION

It is the object of the present invention to provide an assembly for attachment of a component of a motor vehicle which can absorb high withdrawal forces but can still be mounted and dismounted in a simple manner without any major expenditure of force.

According to the invention, provision is made to this end for an assembly for attachment of a component of a motor vehicle, in particular for attachment of a lining part to a carrier, including first and second holding parts, the first holding part having at least one abutment and the second holding part having at least one detent hook. The assembly has a locking bar provided thereon which can be moved between a release position, in which the detent hook can move behind, and be released from, the abutment, and a locking position, in which the detent hook is locked behind the abutment. The locking bar moves automatically from the release position to the locking position. The invention is based on the fundamental idea of providing the locking bar as an additional member which, while securing the detent connection between the two holding parts, neither constitutes any additional expenditure in mounting nor prevents a dismounting. In the release position of the locking bar, the detent hook can be released from the abutment or move behind the abutment without any additional resistance, so that in this position of the locking bar, a simple mounting or dismounting of the second holding part is possible. When the detent hook has snapped into place behind the abutment, the locking bar will automatically move from the release position to the locking position, as a result of which the detent hook will get automatically locked on the abutment after the mounting process. Thus, the detent hook can not be detached from the abutment, so that very great holding forces can be transmitted between the first and the second holding part. After the mounting process, the locking bar can be moved to the release position again, so that the detent hook can be released for dismounting.

The detent hook could be designed to be rigid, for example, and attached for pivotal motion to the second holding part. Preferably, the detent hook is made to be at least partly elastically deformable, so that it will automatically deflect or snap into a position behind the abutment after the mounting process.

In a preferred embodiment, the second holding part includes two detent hooks, and in the locking position the locking bar is arranged between the detent hooks. The detent hooks are more particularly arranged opposite each other, so that they need to be pivoted toward each other or moved toward each other to be released. Since the locking bar is positioned between the detent hooks in the locking position, this motion is ruled out, allowing a simple locating of the detent hooks in place. The locking bar does not require any additional support to locate the detent hook on the abutment since the forces exerted on the locking bar by the detent hooks merely subject it to a compression load; the effective direction of the forces is perpendicular to the possible direction of motion of the locking bar. It is also conceivable that more than two detent hooks are provided radially distributed on the second holding part. In this case, the locking bar may be arranged between the detent hooks in the locking position, so that a springing back of all detent hooks is reliably excluded using one single locking bar.

While the second holding part is mounted to the first holding part, the locking bar is required to be in the release position for the detent hook to be able to move behind the abutment. This may be done, for example, in that in an intermediate mounting position, in which the detent hook is partly inserted in the abutment of the first holding part, the detent hook urges the locking bar into the release position. This means that the locking bar is automatically urged into the release position when the second holding part is mounted to the first holding part, and as soon as the detent hook locks into place behind the abutment, the locking bar automatically moves back into the locking position, in which the detent hook is fixed in place. Therefore, no further operating steps are required while the assembly is mounted, so that mounting is possible in a quick and simple way.

To this end, the locking bar is at least partly made from an elastically deformable material, so that it can be easily displaced by the detent hook and can automatically return to the locking position after the detent hook has locked into place.

It is also conceivable that the locking bar includes a spring member provided on the first holding part and axially protruding against the direction of insertion of the second holding part and which in the release position is pretensioned toward the locking position. When the detent hook is pushed in, the spring member is pretensioned and is released by the detent hook locking in place behind the abutment, so that the spring member can spring back to the locking position.

The spring member may be formed by a leaf spring, for example.

In order to be able to deform the locking bar between the release position and the locking position for dismounting purposes, the locking bar may, for example, be made at least partly from a material which can be deformed between the release position and the locking position by a supply of heat or power. So-called smart materials are adapted to reversibly change their shape under the control of power or heat. When the supply of power or heat is terminated, the material reassumes its original shape. The locking bar may be pre-shaped in the locking position, for example, and be moved to the release position by the supply of power or heat. The assembly may also be installed at inaccessible places since no direct access by means of a tool is required in order to move the locking bar from the locking position to the release position. In addition, it is conceivable to unlock a plurality of assemblies at the same time by a common supply of power or heat, so that a simple dismounting of, for example, larger-sized lining parts is possible.

To allow dismounting in a simple manner, it is also conceivable that the abutment of the first holding part defines a recess having at least one radial opening. The detent hook can be pushed out of the abutment radially (as related to the direction of insertion, which is assumed as being "axial") through this recess, allowing a simple dismounting of the second holding member without any additional aids.

To prevent the detent hooks from slipping out of the recess of the abutment, stops are preferably provided for the second holding part to rest against in the final mounting position.

The forces of dismounting the detent hook from the abutment are dependent on the angle which a detent surface of the detent hook resting against the abutment has in relation to the direction of insertion. With a smaller angle, the withdrawal forces are smaller since the detent hook can slide more easily out of the abutment. The detent surface therefore has an angle with respect to the direction of insertion of from 20° to 120°, preferably of 90°. When the angle is greater than 90°, the detent hook is preferably dismounted by being pushed out laterally through the recess since it is no longer possible for the detent hook to slide out of the abutment in case of a greater angle.

Furthermore, in accordance with the invention provision is made for a method of mounting the assembly of the invention, including the steps of:
 moving the locking bar to a release position by inserting the detent hook into the abutment of the first holding part up to an intermediate mounting position;
 inserting the detent hook further as far as to a final mounting position, in which the detent hook locks into place on the abutment;
 the locking bar automatically moving to the locking position.

Since the locking bar automatically moves to the locking position after the detent hook is fully inserted into the abutment, no additional operating steps are required during the mounting of the assembly.

In accordance with the invention provision is further made for a method of dismounting the assembly according to the invention, including the steps of:
 moving the locking bar from the locking position to the release position;
 releasing the detent hook from the abutment of the first holding part;
 pulling the second holding part off the first holding part.

Releasing the locking bar is not possible here until the locking bar is in the release position. A release involving small withdrawal forces is therefore only possible in this position of the locking bar, so that any inadvertent detachment is reliably excluded.

The locking bar may be moved from the locking position to the release position using a tool, for example.

But it is also conceivable that the locking bar is moved from the locking position to the release position by heat or power. It is of advantage in this embodiment that the assembly can be employed even in positions that are difficult to access and in which the assembly is hard to reach with a tool. Releasing the assembly merely requires that a current can be conducted to the locking bar via a cable or electrodes.

BRIEF DESCRIPTION OF THE DRAWINGS

Further advantages and features will be apparent from the description below in conjunction with the accompanying drawings, in which:

FIGS. 6a and 6b show the process of dismounting the assembly from FIG. 1.

DESCRIPTION OF EXEMPLARY EMBODIMENTS

Figure 1:
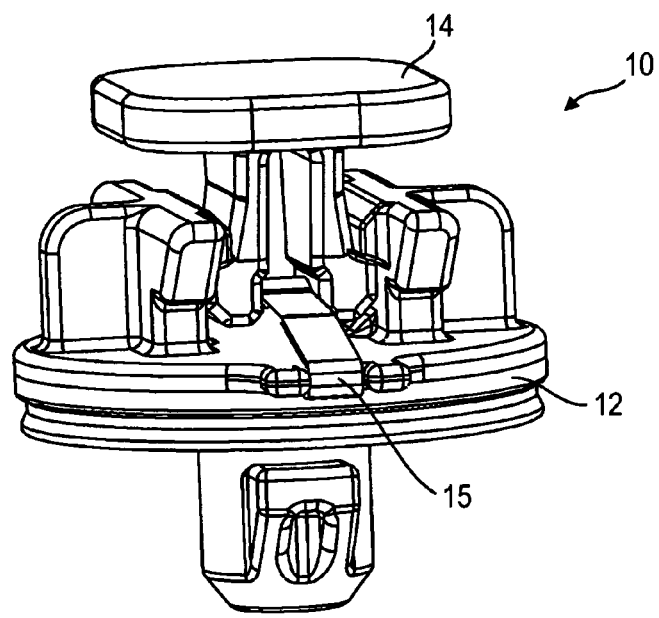
FIG. 1 shows an assembly according to the invention.

FIG. 1 illustrates an assembly 10 for attachment of a component of a motor vehicle. The assembly 10 includes a first holding part 12 and a second holding part 14, which are connected with each other here. The first holding part 12 may be attached to a carrier of a motor vehicle, such as a vehicle body part. The second holding part 14 may be attached to a component, such as a lining part of the vehicle, which is attached to the carrier of the motor vehicle by means of the assembly 10. Basically, the arrangement of the first and second holding parts may also be reverse.

The second holding part 14 is provided with two detent hooks 36 which can lock into place behind abutments 26 provided on the first holding part 12. The first holding part 12 has a locking bar 15 provided thereon for cooperation with the two detent hooks 36.

Figure 2:
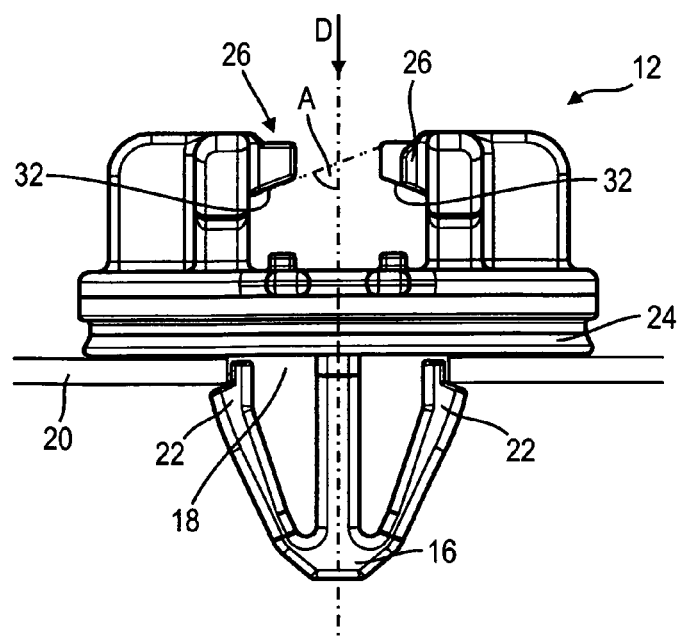
FIG. 2 shows a first holding part of a second embodiment of an assembly according to the invention.

As can be seen in FIG. 2, which shows a second embodiment of the first holding part 12, the first holding part 12 has an insertion member 16 which can be used for inserting the first holding part 12 into an opening 18 of a carrier 20 and fixing it in place. Provided on the insertion member 16 are two detent members 22 here, which can lock into place on the rear side of the carrier 20, thus fixing the first holding part 12 in place on the carrier 20. For sealing the opening 18, a seal 24 is further provided which, when the first holding part 12 has been mounted to the carrier 20, is in surface contact with the front side of the carrier 20.

On the side opposite the insertion member 16, the first holding part 12 includes two abutments 26 radially facing each other, which define a recess 28. In the embodiment illustrated here, only the right-hand abutment 26 is visible; the opposite, left-hand abutment 26 is concealed here by a stop 29. The recess 28 is delimited only by the abutments 26 here and is open perpendicularly to a plane defined by the abutments 26, i.e. the recess 28 is open on the sides.

The abutments 26 each include an abutment surface 32 which is inclined at an angle A with respect to the direction of insertion D of the second holding part 14.

Figure 3:
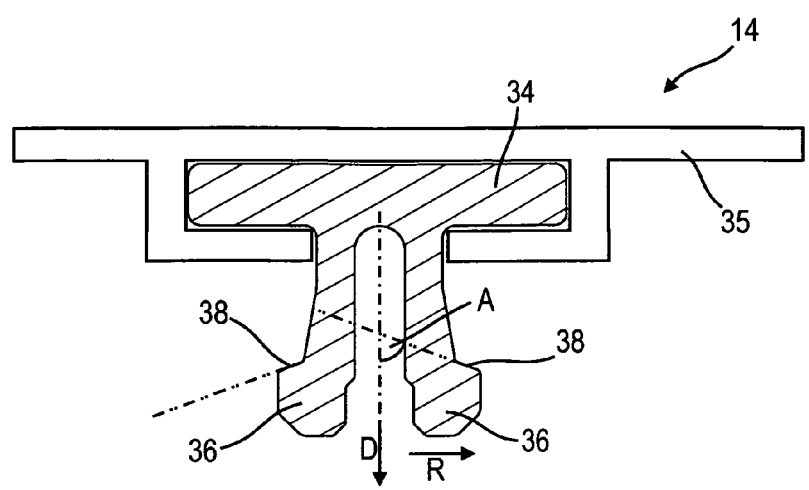
FIG. 3 shows a second holding part of the assembly from FIG. 1.

The second holding part 14 includes a flange 34 to which a lining part 35 is attached (FIG. 3). Provided on the flange 34 are two detent hooks 36 which extend in the direction of insertion D and are made to be elastically deformable, so that they are adapted for limited movement in the radial direction R. But it is also conceivable that the detent hooks 36 are swivel-mounted on the second holding part 14 by means of a joint, for example. Also, the shape and the number of the detent hooks 36 may be varied and adapted as desired. Embodiments having only one detent hook 36 or a plurality of detent hooks 36 are also conceivable. The detent hooks 36 each include a detent surface 38 which is inclined with respect to the direction of insertion D at the same angle A as the abutment surfaces 32 of the first holding part 12.

Figure 4:
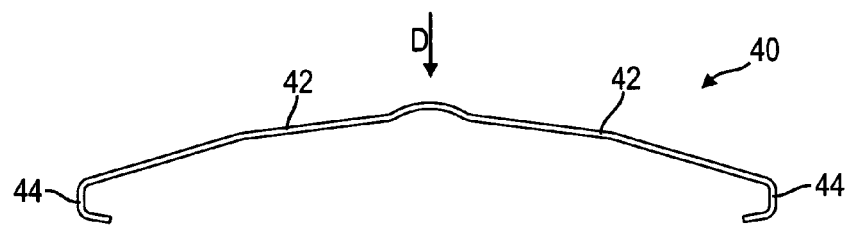
FIG. 4 shows a locking bar of the assembly from FIG. 1.

The locking bar 15 shown in FIG. 4 is mounted in the recess 28 provided between the abutments 26. The locking bar 15 includes two spring sections 42 forming a leaf spring here, and a hook 44 on each end for attachment of the locking bar 15 to the first holding part 12 (see also FIG. 1). The locking bar 15 is made from an elastically deformable material here, such as, e.g., from a spring steel sheet, and can be elastically deformed when it is loaded in the direction of insertion D.

Figure 5:
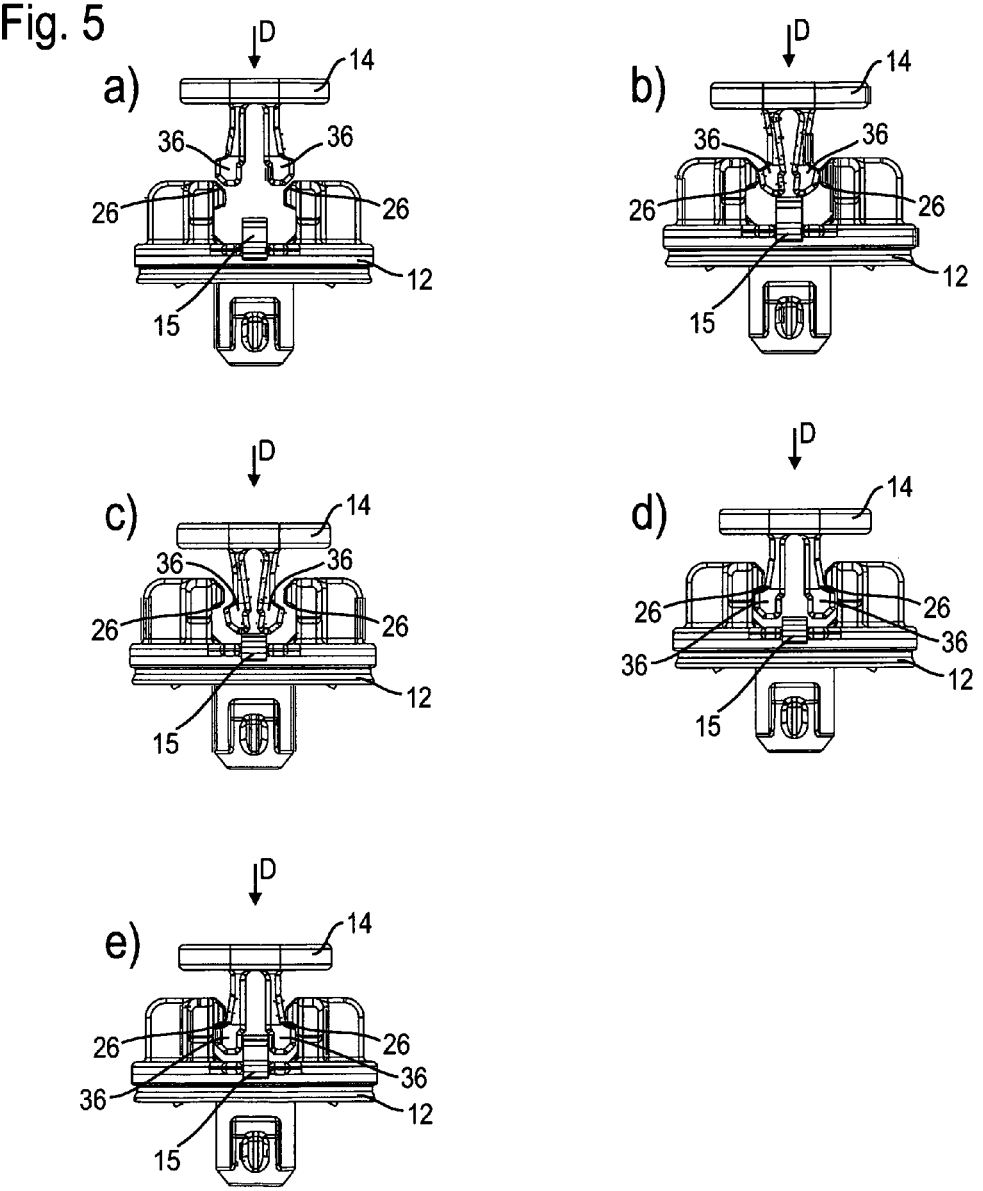
FIGS. 5a to 5e show the process of mounting the assembly from FIG. 1.

The function of the assembly 10 will be explained below with reference to FIGS. 5a to 5e, which show the process of mounting the assembly 10. The first holding part 12 and the second holding part 14 are supplied separately and connected with a carrier 20 (first holding part 12) and with a lining part 35, (second holding part 14), respectively. Subsequently, the detent hooks 36 of the second holding part 14 are inserted into the recess 28 between the abutments 26 of the first holding part 12 in the direction of insertion D (FIG. 5a). The locking bar 15 is in the non-deformed condition, that is, in the locking position.

As can be seen in FIG. 5b, upon a further insertion in the direction of insertion D into the recess 28 between the abutments 26, the detent hooks 36 are displaced by the abutments 26 and pressed radially inwards.

Upon further insertion, the detent hooks 36 press the locking bar 15 in the direction of insertion D against the first holding part 12 and into a release position. In this release position of the locking bar 15, the detent hooks 36 can be moved so far into the first holding part 12 that they can snap radially outward and behind the abutments 26. In this position, the locking bar 15 is pretensioned toward the locking position and is held in the release position by the detent hooks 36.

In the final mounting position shown in FIG. 5d, the detent hooks 36 have sprung radially outward and lie behind the abutments 26. The detent surfaces 38 of the detent hooks 36 thus rest against the abutment surfaces 32 of the abutments 26, so that the second holding part 14 is held in the abutment 26 of the first holding part 12 by the detent hooks 36. Since the detent surfaces 38 and the abutment surfaces 32 are configured to be inclined, the second holding part 14 can be removed from the first holding part 12 in this position again because upon an application of higher withdrawal forces contrary to the direction of insertion D, the detent surfaces 38 can slide along the abutment surfaces 32 and thus the detent hooks 36 can slide radially inward and out of the abutments 26.

But as soon as the detent hooks 36 snap outward and reach the final mounting position, they release the locking bar 15, so that the latter is urged back by the spring members 42 into the locking position shown in FIG. 5e. In the locking position, the locking bar 15 is positioned between the detent hooks 36 and rests against each of them, so that a radial movement of the detent hooks 36 is excluded. The detent hooks 36 can not slide out of the abutments 26, so that the detent hooks 36 are locked on the abutments 26. Thereby, the second holding part 14 is reliably supported at the first holding part 12. Since the locking bar 15 automatically moves from the release position to the locking position owing to the spring tension of the leaf spring 42, no further operating step is required for securing the assembly or for securing the second holding part 14 at the first holding part 12.

To allow a dismounting, the locking bar 15 must be moved from the locking position, in which it locks the detent hooks 36 in place, to the release position, so that the detent hooks 36 are released again and can be detached radially inward from the abutments 26.

This may be performed with the aid of a tool 46, for example, as shown in FIGS. 6a and 6b. The tool 46 is of a flat design here, so that it can be inserted between the carrier 20 and the lining part 35. The tool 46 is pushed radially into the recess 28 between the abutments 26 and, in the process, urges the locking bar 15 from the locking position into the release position, that it, against the first holding part 12. The detent hooks 36 are then no longer locked, so that a simple release of the second holding part 14 from the first holding part 12 is possible (assuming that the angle A allows an automatic release).

To facilitate the insertion of the tool 46 into the recess 28, the first holding part 12 has guide surfaces 48 provided thereon for guiding the tool 46 toward the locking bar 15 and preventing the tool 46 from sliding off.

As an alternative, the locking bar 15 may be made from a so-called smart material. Such a material is able to change its shape when heat or power is supplied. For instance, the locking bar 15 is formed such that in the non-deformed condition, it assumes the locking position on the first holding part 12. When heat or power is supplied, the locking bar 15 will deform to assume the release position, so that the detent hooks 36 can move behind, and can be released from, the abutments 26. With the locking bar 15 de-energized, the locking bar will automatically move to the locking position, so that the detent hooks 36 are automatically locked on the abutments 26. Owing to this, the assembly 10 can also be used at places which are difficult to access and where access with a tool is not possible. In addition, it is conceivable to unlock a plurality of assemblies of this type at the same time by an appropriate supply of power or heat, so that it is possible to dismount large lining parts quickly, for example.

Alternatively, the locking bar 15 may also be transferred from the locking position the release position by induction or magnetism.

In the embodiment shown in FIG. 1, however, the detent hooks 36 may also be pushed out of the recess 28 radially or laterally, so that it is possible to dismount the second holding part 14 from the first holding part 12 without the locking bar 15 being deformed. When the angle of the detent surfaces in relation to the direction of insertion is smaller than 90°, it is no longer possible to pull out the detent hooks 36 contrary to the direction of insertion D, so that a release of the detent hooks 36 is possible exclusively by pushing them out laterally.

Differing from this, in the embodiment illustrated in FIG. 2, the recess 28 has stops 29 provided thereon for the second holding part 14 to rest against in the final mounting position. These stops 29 prevent the detent hooks 36 from inadvertently slipping out of the recess 28.

Deviating from the embodiment illustrated here, the locking bar 15 may also include a different axially protruding spring member 42. Other embodiments, however, which have no spring member 42, are also conceivable. The locking bar 15 may also be moved from the release position to the locking position in any other way.

The assembly 10 may also be delivered in a pre-assembled condition, that is, the first holding part 12 and the second holding part 14 are connected with each other and merely need to be attached to the carrier 20 and to the lining part 35, respectively.

The invention claimed is:

1. An assembly (10) for attachment of a component of a vehicle, in particular for attachment of a lining part (35) to a carrier (20), comprising:
   a first holding part (12) and a second holding part (14), the first holding part (12) having at least one abutment (26) and the second holding part (14) having at least one detent hook (36), and a locking bar that moves between a release position in which the detent hook (36) can move behind the abutment (26) and be released from the abutment (26), and a locking position in which the detent hook (36) is locked behind the abutment (26),
   wherein the locking bar (15) is made of a smart material capable of reversibly changing its shape by supplying heat or electrical power, and
   wherein the locking bar (15) is pre-shaped to assume the locking position on the first holding part (12) and, when dismounting the assembly, is moveable to resume its original shape in the release position, by applying heat or electrical power.

2. The assembly according to claim 1, wherein the detent hook (36) is at least partly elastically deformable.

3. The assembly according to claim 2, wherein the at least one detent hook (36) comprises at least two detent hooks (36), the locking bar (15) being arranged between the detent hooks (36) when in the locking position.

4. The assembly according to claim 1, wherein the locking bar (15) has an intermediate mounting position in which the detent hook (36) is partly inserted in the abutment (26) of the first holding part (12), the detent hook (36) urging the locking bar (15) into the release position.

5. The assembly according to claim 1, wherein the locking bar (15) is at least partly made from an elastically deformable material.

6. The assembly according to claim 1, wherein the locking bar (15) includes a spring member (42) provided on the first holding part (12) and axially protruding against a direction of insertion (D) of the second holding part (14) into the first holding part (12) and which, in the release position, is pretensioned toward the locking position.

7. The assembly according to claim 6, wherein the spring member (42) is a leaf spring.

8. The assembly according to claim 1, wherein the abutment (26) of the first holding part (12) defines a recess (28) having at least one radial opening extending entirely through the first holding part (12) such that the first holding part (12) is laterally removable from the second holding part (14) when the locking bar (15) is in the locking position.

9. The assembly according to claim 8, wherein the second holding part (14) rests against stops provided on the recess (28) when the second holding part (14) is in a final mounting position.

10. The assembly according to claim 1, wherein the detent hook (36) includes a detent surface (38) that rests against the abutment (26) and extends at an angle of from 20° to 120° with respect to the direction of insertion (D).

11. A method of mounting an assembly, comprising the steps of:
   providing the mounting assembly according to claim 1;
   moving the looking bar (15) to a release position by inserting the detent hook (36) into the abutment (26) of the first holding part (12) up to an intermediate mounting position;
   inserting the detent hook (36) further as far as to a final mounting position, in which the detent hook (36) locks into place on the abutment (26);
   the locking bar (15) automatically moving to the locking position.

12. A method of dismounting the assembly (10) according to claim 1, comprising the steps of:
   moving the locking bar (15) from the locking position to the release position;
   releasing the detent hook (36) from the abutment (26) of the first holding part (12);
   pulling the second holding part (14) off the first holding part (12).

13. The method according to claim 12, wherein the locking bar (15) is moved from the locking position to the release position using a tool (46).

14. The method according to claim 12, wherein the locking bar (15) is moved from the locking position to the release position by heat or power.

15. An assembly (10) for attachment of a component of a vehicle, in particular for attachment of a lining part (35) to a carrier (20), comprising:
   a first holding part (12) and a second holding part (14), the first holding part (12) having at least two abutments (26) and the second holding part (14) having at least two detent hooks (36), and
   a locking bar (15) consisting of a leaf spring which can be moved between a release position in which the detent hooks (36) can move behind the abutments (26) and be released from the abutments (26), and a locking position in which the leaf spring (15) is arranged between the detent hooks (36) to lock the detents behind the abutments (26), the leaf spring (15) being pretensioned by a spring force exerted by the leaf spring from the release position to the locking position.

16. The assembly according to claim 1, wherein the second holding part is insertable into the first holding part along a direction of insertion, the locking bar having a longitudinal centerline extending transverse to the direction of insertion.

17. The assembly according to claim 1, wherein the second holding part is insertable into the first holding part along a direction of insertion, the second holding part being movable in a direction extending perpendicular to the direction of insertion when the locking bar is in the locking position to release the second holding part from the first holding part.

18. An assembly for attachment to a component of a vehicle comprising:
   a first holding part (12) having at least one abutment (26) defining a recess (28) and a locking bar (15) extending into the recess;
   a second holding part (14) having at least one detent hook (36) for engaging behind the abutment, the second holding part being movable in a direction of insertion into the recess for engaging the detent hook with the abutment;
   wherein the locking bar has a longitudinal centerline extending transverse to the direction of insertion, the locking bar being movable along the direction of insertion between a release position allowing for relative movement between the detent hook and the abutment in the direction of insertion and a locking position locking the detent hook behind the abutment and preventing relative movement between the detent hook and the abutment in the direction of insertion, wherein the recess (28) of the first holding part includes at least one opening extending radially from the direction of insertion, the second holding part being movable through the opening in the first holding part when the locking bar is in the locking position to release the second holding part from the first holding part.

19. The assembly according to claim 1, wherein the locking bar is capable of reassuming its original shape when the supply of heat or electrical power is terminated.

20. The assembly according to claim 19, wherein the locking bar is pre-shaped to assume the locking position on the first holding part when the assembly is in an assembled state and, when heat or electrical power is supplied, the locking bar is deformed to assume the release position in which the detent hook moves behind the abutment and is released from the abutment.

\* \* \* \* \*